(12) United States Patent
Lee et al.

(10) Patent No.: US 9,044,828 B2
(45) Date of Patent: Jun. 2, 2015

(54) CLAMPING DEVICE AND LASER WELDING APPARATUS USING THE SAME

(71) Applicant: SUNGWOO HITECH CO., LTD., Busan (KR)

(72) Inventors: Mun Yong Lee, Busan (KR); Byung-Sun Song, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 355 days.

(21) Appl. No.: 13/713,121

(22) Filed: Dec. 13, 2012

(65) Prior Publication Data

US 2014/0034620 A1 Feb. 6, 2014

(30) Foreign Application Priority Data

Aug. 6, 2012 (KR) .......................... 10-2012-0085686

(51) Int. Cl.
| | |
|---|---|
| *B23Q 3/06* | (2006.01) |
| *B23K 26/20* | (2014.01) |
| *B23K 37/04* | (2006.01) |
| *B23K 26/08* | (2014.01) |
| *B23K 26/30* | (2014.01) |

(52) U.S. Cl.
CPC ................ *B23K 26/20* (2013.01); *B23K 37/04* (2013.01); *B23Q 3/06* (2013.01); *B23K 37/0408* (2013.01); *B23K 37/0435* (2013.01); *B23K 26/0807* (2013.01); *B23K 26/422* (2013.01)

(58) Field of Classification Search
CPC ........... B23Q 3/06; B23K 37/04; B23K 26/20
USPC .......... 269/126; 219/121.63, 121.64, 158, 161
See application file for complete search history.

(56) References Cited

U.S. PATENT DOCUMENTS

| | | | |
|---|---|---|---|
| 6,841,756 B2 * | 1/2005 | Sonoda et al. ........... | 219/121.63 |
| 7,385,157 B2 * | 6/2008 | Oda et al. ................. | 219/121.63 |

FOREIGN PATENT DOCUMENTS

| | | |
|---|---|---|
| JP | 06-285660 | 10/1994 |
| JP | 2004-358529 | 12/2004 |
| KR | 10-2010-0038837 | 4/2010 |
| KR | 10-2011-0005006 | 1/2011 |
| KR | 10-2012-0079618 | 7/2012 |
| KR | 10-2013-0027391 | 3/2013 |

* cited by examiner

*Primary Examiner* — Samuel M Heinrich
(74) *Attorney, Agent, or Firm* — Lexyoume IP Meister, PLLC

(57) ABSTRACT

A clamping device and a laser welding apparatus using the same are disclosed. The clamping device may include: an upper clamping link mounted rotatably upwardly or downwardly by a hinge shaft; a lower clamping link mounted rotatably in an opposite direction of the upper clamping link by the hinge shaft and corresponding to the upper clamping link; at least two upper rollers rotatably mounted at the upper clamping link; at least two lower rollers rotatably mounted at the lower clamping link, corresponding to the upper roller, and fixing a welding object together with the upper rollers; and an operating cylinder configured to rotate the upper clamping link and the lower clamping link in opposite directions to each other.

7 Claims, 5 Drawing Sheets

CLAMPING DEVICE AND LASER WELDING APPARATUS USING THE SAME

CROSS-REFERENCE TO RELATED APPLICATION

This application claims priority to and the benefit of Korean Patent Application No. 10-2012-0085686 filed in the Korean Intellectual Property Office on Aug. 6, 2012, the entire contents of which are incorporated herein by reference.

BACKGROUND OF THE INVENTION (a) Field of the Invention

The present invention relates to a clamping device and a laser welding apparatus using the same. More particularly, the present invention relates to a clamping device and a laser welding apparatus using the same which can fix a welding object using a roller and maintain a welding gap.

(b) Description of the Related Art

Generally, a clamping device fixes a material not to move at working process of the material such as cutting, sheet metal working, welding, and so on.

Particularly, the clamping device is typically mounted on a jig in a welding device which performs welding process after a welding object is fixed using the jig. The clamping device fixes the welding object and maintains welding intervals if a plurality of welding points exists on the welding object at laser welding.

Such a clamping device includes one or more clampers fixing the welding object, a hydraulic pressure cylinder or a pneumatic pressure cylinder operating the clamper, and mechanical elements such as links delivering movement of the cylinder to the clamper.

Since the welding object is fixed and the welding intervals of the welding object are maintained using a plurality of clampers in a case that a plurality of welding points is laser-welded using a conventional clamping device, however, the number of must-be-used clampers may be increased.

If the number of the must-be-used clampers increases, manufacturing cost of jigs of the welding apparatus may be increased. In addition, intervals between the welding points may be restricted because a plurality of clampers is disposed on the jigs having a restricted size. Furthermore, welding may not be performed and interference among a plurality of clampers, the welding apparatus, and the welding object may occur in a case that welding points of the welding object are closely located to each other. Therefore, the welding object may be welded badly.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a clamping device and a laser welding apparatus using the same having advantages of maintaining welding intervals using rollers, reducing manufacturing cost by simplifying a laser welding jig, and performing laser welding smoothly regardless of the number of welding points.

A clamping device according to one or more exemplary embodiments of the present invention may include: an upper clamping link mounted rotatably upwardly or downwardly by a hinge shaft; a lower clamping link mounted rotatably in an opposite direction of the upper clamping link by the hinge shaft and corresponding to the upper clamping link; at least two upper rollers rotatably mounted at the upper clamping link; at least two lower rollers rotatably mounted at the lower clamping link, corresponding to the upper roller, and fixing a welding object together with the upper rollers; and an operating cylinder configured to rotate the upper clamping link and the lower clamping link in opposite directions to each other.

A pair of upper rollers may be mounted at a front end of the upper clamping link, a pair of lower rollers may be mounted at a front end of the lower clamping link, and each pair of the pair of upper rollers and the pair of lower rollers may be disposed with a predetermined distance so as to position a welding point of the welding object therebetween.

The operating cylinder may be connected to rear ends of the upper clamping link and the lower clamping link so as to rotate the upper clamping link and the lower clamping link in opposite directions to each other.

A laser welding apparatus according to another exemplary embodiment of the present invention may include: the clamping device; a laser scanner irradiating a laser beam to a welding point of a welding object; and a supporting structure having an upper portion at which the laser scanner is mounted and a lower portion at which the clamping device is mounted, and mounted on a floor of a welding workshop.

The supporting structure may include: a base plate having a tetragonal plate shape so as to be mounted on the floor of the welding workshop; and a supporting beam standing perpendicularly on the base plate and fixing and supporting the laser scanner and the clamping device.

A laser welding apparatus according to other exemplary embodiment of the present invention may include: the clamping device; a laser scanner irradiating a laser beam to a welding point of a welding object; and a supporting bracket having an upper portion at which the laser scanner is mounted and a lower portion at which the clamping device is mounted, and supporting the laser scanner and the clamping device.

The supporting bracket may be mounted at a robot.

| <Description of symbols> | |
| --- | --- |
| 10: supporting structure | 20: welding object |
| 30: clamping device | 31: hinge shaft |
| 32a, 32b: clamping link | 33: roller |
| 34: operating cylinder | 40: laser scanner |

DETAILED DESCRIPTION OF THE EMBODIMENTS

Hereinafter, exemplary embodiments of the present invention will be described in detail with reference to the accompanying drawings.

Figure 1:
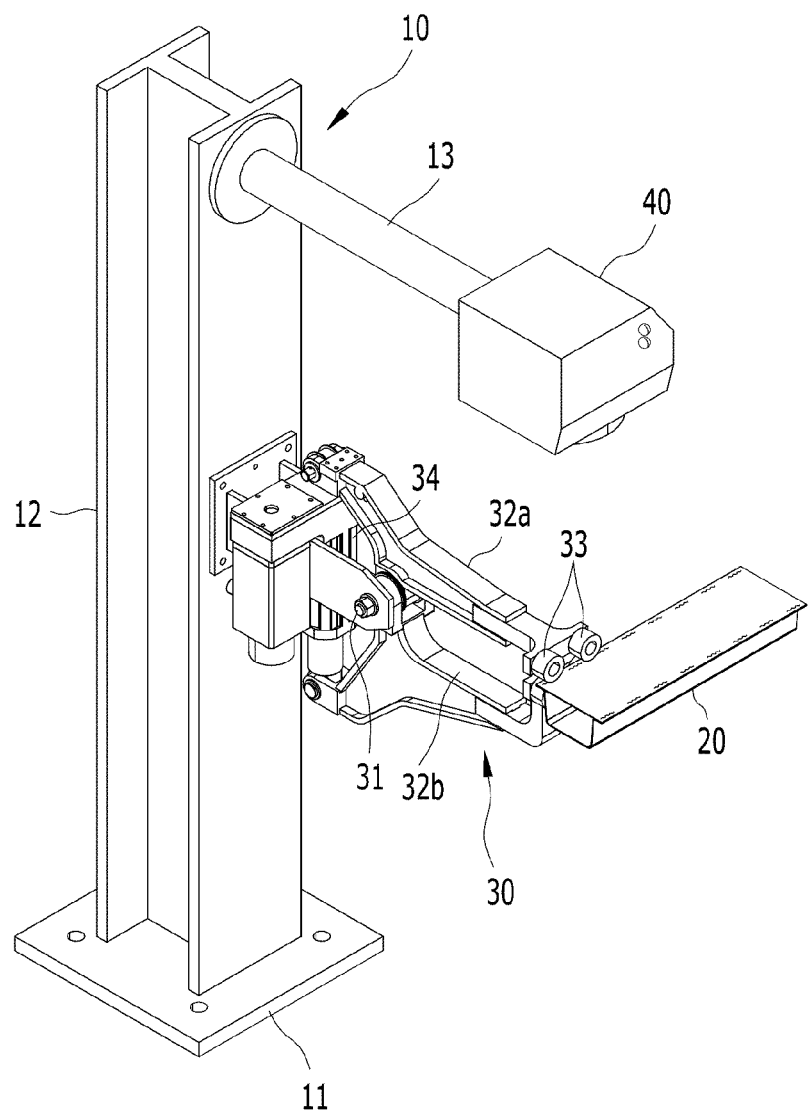
FIG. 1 is a perspective view of a laser welding apparatus having a clamping device according to an exemplary embodiment of the present invention.
Figure 2:
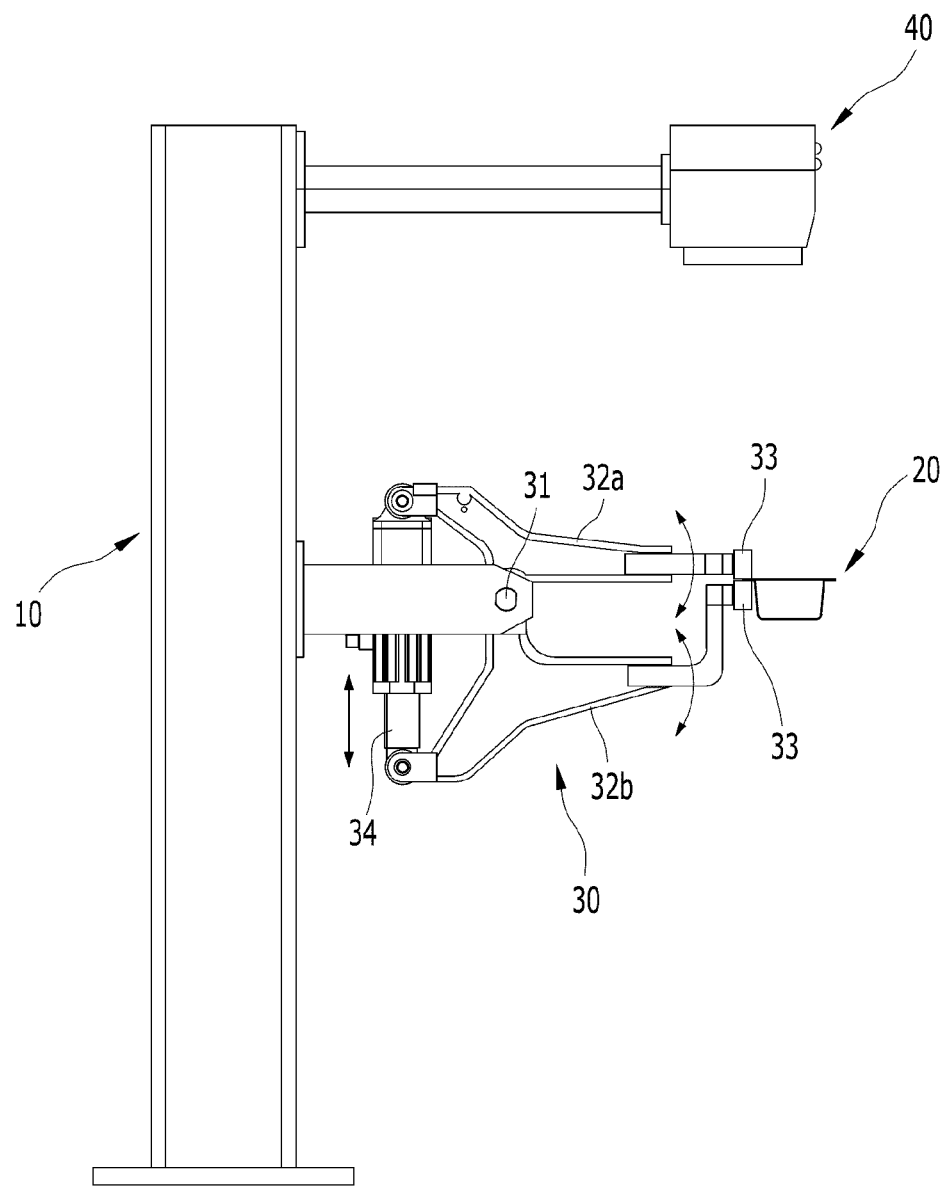
FIG. 2 is a side view of a laser welding apparatus having a clamping device according to an exemplary embodiment of the present invention.

FIG. 1 is a perspective view of a laser welding apparatus having a clamping device according to an exemplary embodiment of the present invention, and FIG. 2 is a side view of a laser welding apparatus having a clamping device according to an exemplary embodiment of the present invention.

Referring to FIG. 1 and FIG. 2, a laser welding apparatus having a clamping device according to an exemplary embodiment of the present invention includes a supporting structure 10 having an H-shape, the clamping device 30 mounted at a lower portion of the supporting structure and supporting and fixing a welding object 20, and a laser scanner 40 mounted at an upper portion of the supporting structure 10 and irradiating a laser on the welding object 20 supported by the clamping device so as to perform welding.

The supporting structure 10 includes a base plate 11 having a tetragonal plate shape and mounted on a floor of a welding workshop, and a supporting beam 12 standing perpendicularly on the base plate 11 and mounting and fixing the laser scanner 40 and the clamping device 30.

According to the present exemplary embodiment, it is exemplified but is not limited to that a cross-section of the supporting beam 12 has the H-shape. The cross-sectional shape of the supporting beam 12 may be determined by a person of an ordinary skill in the art.

In addition, the supporting structure 10 may have any shape which can stably support the laser scanner 40 and the clamping device 30.

The laser scanner 40 performs welding by irradiating the laser to the welding object 20. The laser scanner 40 is well known to a person of an ordinary skill in the art, and thus detailed description thereof will be omitted.

A supporting bar 13 is mounted at the upper portion of the supporting beam 12. The supporting bar 13 is extended perpendicularly from the supporting beam 12, an end of the supporting bar 13 is fixed to the upper portion of the supporting beam 12, and the laser scanner 40 is mounted at the other end of the supporting bar 13.

The clamping device 3 is positioned under the laser scanner 40 and is fixed to the supporting beam 12 through a suitable mounting bracket.

The clamping device 30 includes an upper clamping link 32a and a lower clamping link 32b mounted so as to be rotatable upwardly or downwardly by a hinge shaft 31, at least two upper rollers 33 rotatably mounted at a front end of the upper clamping link 32a and disposed horizontally apart from each other with a predetermined distance, at least two lower rollers 33 rotatably mounted at a front end of the lower clamping link 32b and corresponding to the at least two upper rollers 33, and an operating cylinder 34 connecting rear ends of the clamping links 32a and 32b and rotating the clamping links 32a and 32b simultaneously.

The operating cylinder 34 may be a hydraulic pressure cylinder, pneumatic pressure cylinder, or any type of cylinders.

Referring to FIG. 2, operation of the operating cylinder 34 is controlled by a controller (not shown).

If the controller moves the operating cylinder 34 rearward, the upper clamping link 32a rotates downwardly with respect to the hinge shaft 31 but the lower clamping link 32b rotates upwardly with respect to the hinge shaft 31.

In this case, since a distance between the upper and lower rollers 33 mounted at the front ends of the upper clamping link 32a and the lower clamping link 32b narrows, the welding object 20 moving between the upper and the lower rollers 33 is fixed therebetween.

If the controller, on the contrary, moves the operating cylinder 34 forward, the upper clamping link 32a rotates upwardly with respect to the hinge shaft 31 but the lower clamping link 32b rotates downwardly with respect to the hinge shaft 31.

In this case, since the distance between the upper and lower rollers 33 mounted at the front ends of the upper clamping link 32a and the lower clamping link 32b widens, the welding object can be extracted from the upper and lower rollers 33.

Figure 3:
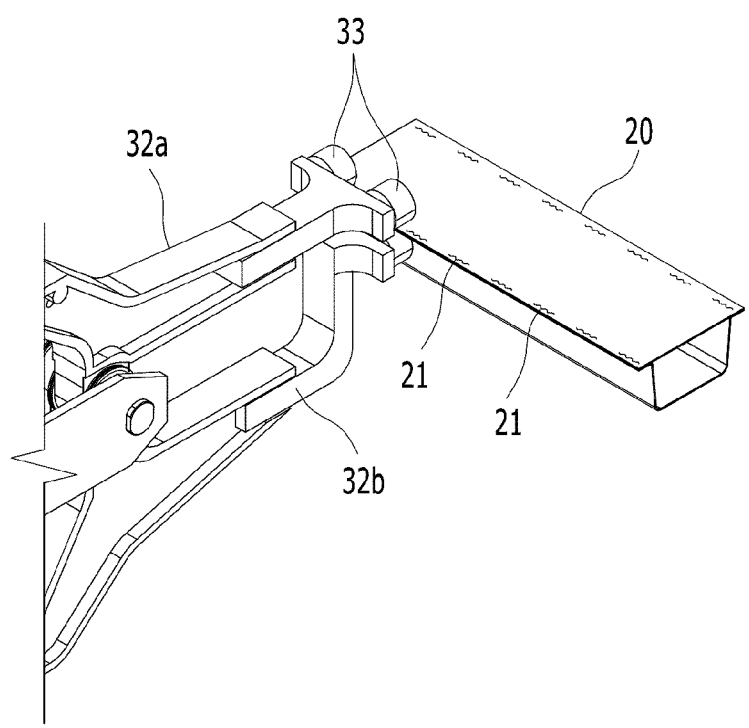
FIG. 3 is a perspective view of a clamping device according to an exemplary embodiment of the present invention with a welding object being fixed thereto.

FIG. 3 is a perspective view of a clamping device according to an exemplary embodiment of the present invention with a welding object being fixed thereto.

Referring to FIG. 3, a plurality of welding points 21 that will be welded is disposed on the welding object 20 along a length direction of the welding object 20.

The welding points 21 are continuously disposed with predetermined distances along the length direction of the welding object 20. The welding points 21 are positioned between the two upper or lower rollers 33 and are moved between the upper and lower rollers 33 by a robot or any suitable transfer apparatus.

Figure 4:
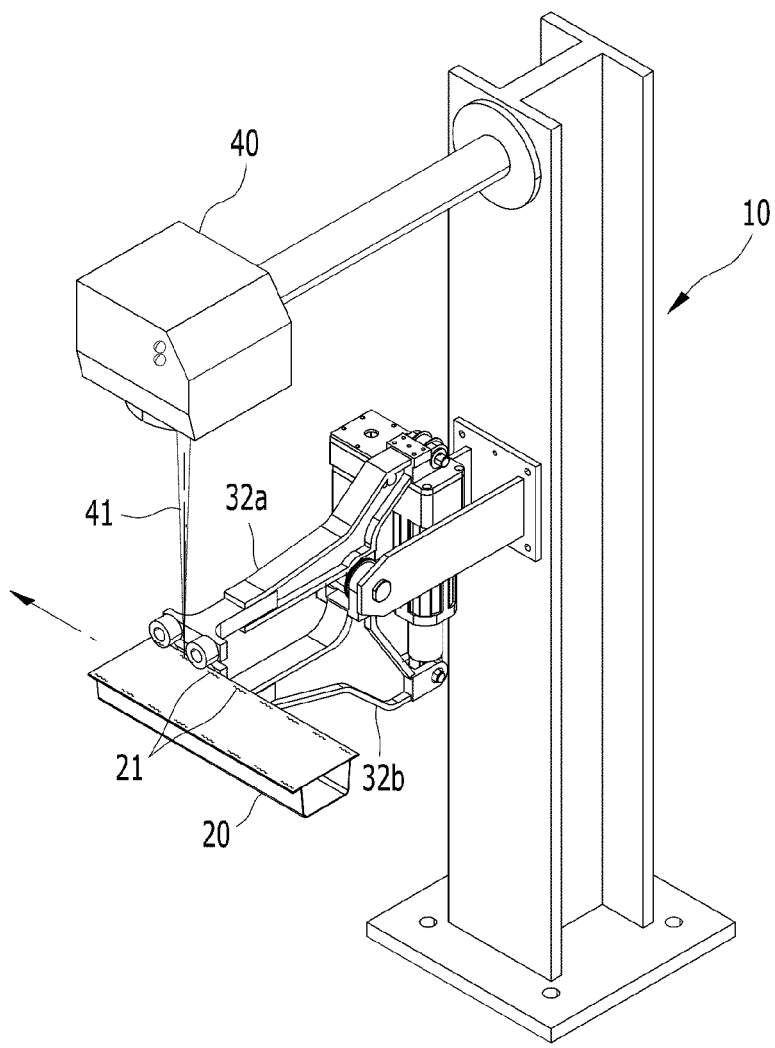
FIG. 4 is a perspective view for illustrating that a welding object is welded using a laser welding apparatus having a clamping device according to an exemplary embodiment of the present invention.

FIG. 4 is a perspective view for illustrating that a welding object is welded using a laser welding apparatus having a clamping device according to an exemplary embodiment of the present invention.

Referring to FIG. 4, in a state that the welding points 21 of the welding object 20 are moved between the upper and lower rollers 33 by the robot or any suitable transfer apparatus, the laser scanner 40 irradiates the laser beam 41 on the welding points 21 so as to weld the welding points 21.

The welding points 21 are controlled to be positioned between the two upper or lower rollers 33, and the laser scanner 40 irradiates the laser beam 41 between the two upper or lower rollers 33. Therefore, welding interval between the welding points 21 may be maintained to be constant.

In addition, if the welding points 21 are closely positioned with each other, welding is smoothly performed by the laser beam irradiated between the two upper or lower rollers 33.

Since the welding object is fixed and the welding interval is maintained by a pair of clamping links 32a and 32b and two pairs of rollers 33, a plurality of clampers for maintaining the welding interval is not necessary. Therefore, a jig structure of the laser welding apparatus may be simplified and manufacturing cost of the jig structure may be lowered.

Figure 5:
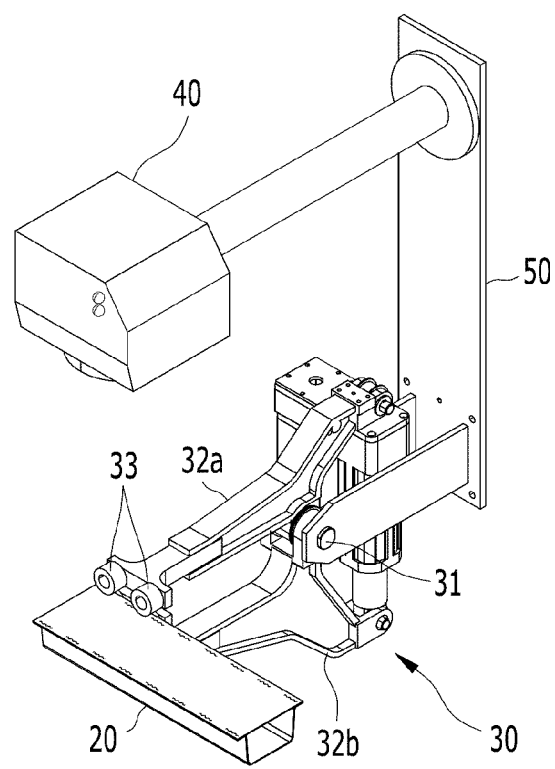
FIG. 5 is a perspective view of a laser welding apparatus having a clamping device according to another exemplary embodiment of the present invention.

FIG. 5 is a perspective view of a laser welding apparatus having a clamping device according to another exemplary embodiment of the present invention.

FIG. 5 illustrates a laser welding apparatus according to another exemplary embodiment of the present invention. That is, the laser scanner 40 and the clamping device 30 are mounted using a supporting bracket 50 instead of the supporting structure 10 according to another exemplary embodiment of the present invention.

Since the laser scanner 40 and the clamping device 30 are mounted using the supporting bracket 50 and the supporting bracket 50 is fixed to a robot (not shown), the laser welding apparatus of robot type may be realized. Since other components according to another exemplary embodiment of the present invention are the same as those according to an exemplary embodiment of the present invention, detailed description will be omitted.

Since the welding object can be rotatably supported and be fixed using the rollers mounted at the clamping links that can be rotatable upwardly or downwardly according to an exemplary embodiment of the present invention, the welding object may be stably fixed before performing the welding process and the welding interval between the welding points may be maintained to be constant.

Since a plurality of clampers for fixing the welding object is not needed to be mounted at the jig, the jig structure may be simplified and manufacturing cost of the jig may be lowered.

In a case that a plurality of welding points is positioned closely with each other on the welding object, the welding point may be disposed between the rollers. Therefore, welding process may be smoothly performed and welding productivity may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A clamping device, comprising:
   an upper clamping link mounted rotatably upwardly or downwardly by a hinge shaft;
   a lower clamping link mounted rotatably in an opposite direction of the upper clamping link by the hinge shaft and corresponding to the upper clamping link;
   at least two upper rollers rotatably mounted at the upper clamping link;
   at least two lower rollers rotatably mounted at the lower clamping link, corresponding to the upper roller, and fixing a welding object together with the upper rollers; and
   an operating cylinder configured to rotate the upper clamping link and the lower clamping link in opposite directions to each other.

2. The clamping device of claim 1, wherein a pair of upper rollers is mounted at a front end of the upper clamping link, a pair of lower rollers is mounted at a front end of the lower clamping link, and each pair of the pair of upper rollers and the pair of lower rollers is disposed with a predetermined distance so as to position a welding point of the welding object therebetween.

3. The clamping device of claim 2, wherein the operating cylinder is connected to rear ends of the upper clamping link and the lower clamping link so as to rotate the upper clamping link and the lower clamping link in opposite directions to each other.

4. A laser welding apparatus, comprising:
   a clamping device;
   a laser scanner irradiating a laser beam to a welding point of a welding object; and
   a supporting structure having an upper portion at which the laser scanner is mounted and a lower portion at which the clamping device is mounted, and mounted on a floor of a welding workshop,
   wherein the clamping device is the clamping device of claim 1.

5. The laser welding apparatus of claim 4, wherein the supporting structure comprises:
   a base plate having a tetragonal plate shape so as to be mounted on the floor of the welding workshop; and
   a supporting beam standing perpendicularly on the base plate and fixing and supporting the laser scanner and the clamping device.

6. A laser welding apparatus, comprising:
   a clamping device;
   a laser scanner irradiating a laser beam to a welding point of a welding object; and
   a supporting bracket having an upper portion at which the laser scanner is mounted and a lower portion at which the clamping device is mounted, and supporting the laser scanner and the clamping device,
   wherein the clamping device is the clamping device of claim 1.

7. The laser welding apparatus of claim 6, wherein the supporting bracket is mounted at a robot.

* * * * *